United States Patent [19]
Carlson et al.

[11] Patent Number: 5,466,284
[45] Date of Patent: Nov. 14, 1995

[54] UNIVERSAL BLACK INK

[75] Inventors: Gene D. Carlson, Crocker Township, Iowa; Alfredo R. Dela Cruz, Alpharetta, Ga.

[73] Assignee: Frye Copysystems, Inc., Des Moines, Iowa

[21] Appl. No.: 293,485

[22] Filed: Aug. 22, 1994

[51] Int. Cl.⁶ .................................................. C09D 11/12
[52] U.S. Cl. ........................................ 106/31 R; 106/32
[58] Field of Search .............................. 106/20 R, 31 R, 106/32, 23 A

[56] References Cited

U.S. PATENT DOCUMENTS 4,808,227  2/1989  Yuasa et al. ............................. 106/32
4,870,427  9/1989  Kobayahi et al. ....................... 427/147

Primary Examiner—Helene Klemanski
Attorney, Agent, or Firm—Zarley, McKee, Thomte, Voorhees, & Sease

[57] ABSTRACT

A carbon paper ink is described which includes a 2200–3000 heavy oil. The ink also includes Montan wax, paraffin slack wax, carbon black, a lubricant, and a filler. The heavy oil acts as a dispersant to provide for more even pigmentation and darker printing of the ink.

22 Claims, No Drawings

UNIVERSAL BLACK INK

BACKGROUND OF THE INVENTION

The present invention relates to an improved carbon paper ink and method for making the same.

Prior art carbon paper ink has several disadvantages. Often the ink's pigmentation is not always evenly distributed, which results in lower print quality. Also, to achieve the requisite darkness of print, the manufacturer must often use large quantities of ink, which results in higher manufacturing costs.

In seeking to resolve these difficulties, Applicants have found that certain heavy oils and polybutenes when added to carbon paper ink impart favorable qualities. These substances, which have traditionally been used as industrial lubricants, provide the surprising results of producing an ink that is not only darker, but also has more uniform pigmentation than inks currently available.

Therefore, a primary object of the present invention is the provision of an improved carbon paper ink, and a method for making the same.

A further object of the present invention is the provision of an improved carbon paper ink which has even distribution of pigmentation throughout.

A further object of the present invention is the provision of an improved carbon paper ink for use on carbon paper which prints darker than ink presently available in the art.

A still further object of the present invention is a provision of an improved carbon paper ink and method for making the same which is economical in manufacture, and efficient in use.

SUMMARY OF THE INVENTION

The present invention disclosure involves the use of a 2200 to 3000 seconds heavy oil at 60° C. as a dispersant. Alternatively, polybutenes of the same viscosity and in the same amounts will produce the same quality of carbon paper.

The ink also contains the following ingredients: 1.) montan wax—an ester wax with melt point of 160° to 190° F.; 2.) paraffin slack wax—a semi-refined wax with melt point of 120°–140° F. and an oil content of 1–30%; 3.) carbon black—a 600 or 700 series rubber grade black.

In preparation, montan wax, heavy oil, and paraffin wax are first melted together, then mixed. The carbon black and filler are then slowly added then mixed in at maximum speed. The mixture is then ground. Following grinding, the speed of the mixer is slowed, mineral seal oil is added, then all ingredients are mixed again. These steps can be accomplished by use of a shot mill, ball mill, or roller mill, with the shot mill being preferred. The heavy oil or polybutene acts as an improved dispersing agent. Its effect on the ink when used in combination with the other listed ingredients, is to impart more even pigmentation and a darker color when used in printing.

DETAILED DESCRIPTION OF THE PREFERRED EMBODIMENT

The minimum ingredients necessary for the present invention are montan wax, a 2200–3000 seconds heavy oil at 60° F. or polybutene, paraffin slack wax, and carbon black. A lubricant such as mineral seal oil, and/or a filler, such as kaolin clay, may be added as well. The lubricant preferably has a flash point of between 150° to 180° F. The preferred heavy oils have viscosities within the range as set forth above. They are typically paraffinic or naphthenic heavy oils.

Some of the preferred heavy oils which may be used include: HF Bright Stock (trade name) produced by Magie Bros., 150 Solvent Bright by Mobil, by Witco-Golden Bear, Bright Stock by ARCO, and Bright Stock by Exxon. Likewise, the preferred polybutenes also have viscosities within the above-stated range. Some of the preferred polybutenes are: L-100 produced by Amoco, and H-50 by Amoco.

Below are examples of preferred combinations of materials for use in the present invention:

| Material | % by Weight |
|---|---|
| EXAMPLE 1 | |
| Montan Wax | 3 |
| 2200–3000 Seconds Heavy Oil at 60° F. | 3 |
| Paraffin Slack Wax | 75 |
| Carbon Black | 15 |
| Mineral Seal Oil | 1 |
| Kaolin Clay | 3 |
| EXAMPLE 2 | |
| Montan Wax | 5 |
| 2200–3000 Seconds Heavy Oil at 60° F. | 5 |
| Paraffin Slack Wax | 68 |
| Carbon Black | 16 |
| Mineral Seal Oil | 2 |
| Kaolin Clay | 4 |
| EXAMPLE 3 | |
| Montan Wax | 7 |
| 2200–3000 Seconds Heavy Oil at 60° F. | 7 |
| Paraffin Slack Wax | 61 |
| Carbon Black | 17 |
| Mineral Seal Oil | 3 |
| Kaolin Clay | 5 |
| EXAMPLE 4 | |
| Montan Wax | 10 |
| 2200–3000 Seconds Heavy Oil at 60° F. | 10 |
| Paraffin Slack Wax | 52 |
| Carbon Black | 18 |
| Mineral Seal Oil | 4 |
| Kaolin Clay | 6 |
| EXAMPLE 5 | |
| Montan Wax | 15 |
| 2200–3000 Seconds Heavy Oil at 60° F. | 15 |
| Paraffin Slack Wax | 39 |
| Carbon Black | 19 |
| Mineral Seal Oil | 5 |
| Kaolin Clay | 7 |
| EXAMPLE 6 | |
| Montan Wax | 20 |
| 2200–3000 Seconds Heavy Oil at 60° F. | 20 |
| Paraffin Slack Wax | 26 |
| Carbon Black | 20 |
| Mineral Seal Oil | 6 |
| Kaolin Clay | 8 |
| EXAMPLE 7 | |
| Montan Wax | 25 |
| 2200–3000 Seconds Heavy Oil at 60° F. | 25 |
| Paraffin Slack Wax | 7 |
| Carbon Black | 25 |
| Mineral Seal Oil | 8 |
| Kaolin Clay | 10 |

The above percentages may be varied without detracting from the invention. Below is a list of the various permissible ranges of percent by weight of each of the above materials:

| Materials | % by Weight |
| --- | --- |
| Montan Wax | 3–25% |
| 2200–3000 Seconds Heavy Oil | 3–25% |
| Paraffin Slack Wax | 7–75% |
| Carbon Black | 15–25% |
| Mineral Seal Oil | 0–8% |
| Kaolin Clay | 0–10% |

The montan wax is a dispersing agent and imparts hardness to the ink. Similarly, the 2200–3000 seconds heavy oil at 60° F. is a dispersing agent and serves to control the hardness of the ink: the more oil used, the softer the ink. The paraffin slack wax is a carrier and the carbon black is used for coloration purposes. The mineral seal oil is used as a lubricant and the kaolin clay as a filler.

The ink is preferably prepared in a shot mill at a temperature of 180°–210° F. The montan wax, heavy oil, and paraffin wax are first melted together, then mixed for at least 5 minutes, preferably for 15 minutes.

Next, the carbon black and kaolin clay is slowly added to the mix with slow agitation. After the required amounts are added, the speed of the mixer is increased to maximum. Next, the mix is ground for 15 minutes or longer, preferably 45 minutes. The fineness of the grind is 6 on the gauge.

Next, the mixer speed is slowed down and the mineral seal oil is added. All the ingredients are then mixed together for at least 1 minute, preferably 5 minutes.

The ink can be applied by a rotary roller method, whether a plain cylinder, rubber plate wrap cylinder, or gravure roll.

The weight of ink applied on a tissue is 1.20–2.0 lbs per 20×30×500 ream size.

For cleanness and legibility, the ideal ink weight is 1.80 lbs. for handwriting and mechanical applications. The coating temperature is 180°–230° F. and the chilling temperature is 30°–50° F.

In the specification, there has been set forth a preferred embodiment of the invention, and all those specific terms are employed, these are used in a generic and descriptive sense only and not for purposes of limitation. Changes in the form and the proportion of parts as well as in the substitution of equivalence or contemplated as circumstances may suggest or render expedient without departing from the spirit and scope of the invention as further defined in the following claims.

We claim:

1. A carbon paper ink comprising:
   a montan wax with melt point of 160°–190° F.;
   a 2200–3000 seconds heavy oil at 60° F.;
   a paraffin slack wax with melt point of 120°–140° F. and oil content of 1–30%; and carbon black.

2. A carbon paper ink according to claim 1 wherein said montan wax is present in a percentage by weight of between 3–25%.

3. A carbon paper ink according to claim 1 wherein said heavy oil is present in a percentage by weight of between 3–25%.

4. A carbon paper ink according to claim 1 wherein said Paraffin slack wax is present in a percentage by weight of between 7–75%.

5. A carbon paper ink according to claim 1 wherein said carbon black is present in a percentage by weight of between 15–25%.

6. The carbon paper ink according to claim 1 further comprising a lubricant.

7. The carbon paper ink of claim 6 wherein the lubricant is mineral seal oil.

8. The carbon paper ink according to claim 6 wherein said lubricant is present in a percentage by weight of between 1–8%.

9. The carbon paper ink according to claim 1 further comprising a filler.

10. The carbon paper ink of claim 9 wherein the filler is kaolin clay.

11. A carbon paper ink according to claim 9 wherein said filler is present in a percentage by weight of between 3–10%.

12. A black ink useful for carbon paper wherein said ink contains a heavy oil, wherein said heavy oil is a 2200–3000 seconds heavy oil at 60° F.

13. The oil of claim 12 wherein said oil is a paraffinic heavy oil.

14. The oil of claim 12 wherein said oil is a naphthenic heavy oil.

15. A black ink useful for carbon paper wherein said ink contains a 2200–3000 second polybutene.

16. A method for making carbon paper ink comprising:
   melting a montan wax with a paraffin slack wax and a heavy oil, said montan wax having melt point of 160°–190° F.;
   said paraffin slack wax having a melt point of 120°–140° F. and an oil content of 1–30%;
   mixing said montan wax with said paraffin slack wax for at least 5 minutes;
   adding carbon black to said montan wax and paraffin slack wax with low agitation;
   mixing at maximum speed;
   grinding for at least 15 minutes.

17. The method of claim 14 wherein the fineness of said grind is 6 on the gauge.

18. The method of claim 16 wherein a filler is added with said carbon black using said low agitation.

19. The method of claim 16 wherein a lubricant is added following said grinding for at least 15 minutes.

20. The method of claim 19 wherein the lubricant has a flashpoint of 150°–180° F.

21. The method of claim 19 wherein the lubricant is added after slowing the speed of the mixer following said grinding for at least 15 minutes.

22. A carbon paper ink comprising:
   a montan wax with melt point of 160°–190° F.;
   a 2200–3000 seconds heavy oil at 60° F.;
   a paraffin slack wax with melt point of 120°–140° F. and mineral seal oil content of 1–30%;
   kaolin clay; and
   carbon black.

* * * * *